United States Patent [19]
Airhart

[11] 4,043,074
[45] Aug. 23, 1977

[54] GRAPHITE FIBER FISHING ROD
[75] Inventor: Tom P. Airhart, Hurst, Tex.
[73] Assignee: Skyline Industries, Inc., Fort Worth, Tex.
[21] Appl. No.: 645,650
[22] Filed: Dec. 31, 1975
[51] Int. Cl.$^2$ ............................................. A01K 87/00
[52] U.S. Cl. .......................... 43/18 GF; 273/DIG. 23; 428/367
[58] Field of Search .................... 43/18, 18 GF, 18 R; 138/118, 124, 129, 137, 140, 150, 178, DIG. 2, DIG. 7, 133, 144, 145; 156/173, 175, 187, 188; 428/367, 368, 377, 902, 366, 395, 295, 398, 171, 164; 273/80 R, 80 B, DIG. 7, DIG. 23, 73 F

[56] References Cited
U.S. PATENT DOCUMENTS

| 3,260,010 | 7/1966 | Dubois | 43/18 GF |
| 3,646,610 | 2/1972 | Jackson | 138/140 |
| 3,700,535 | 10/1972 | McCoy et al. | 428/367 |
| 3,835,569 | 9/1974 | Gould et al. | 43/18 GF |
| 3,880,422 | 4/1975 | Boggild et al. | 273/DIG. 7 |

FOREIGN PATENT DOCUMENTS

| 1,184,145 | 12/1964 | Germany | 43/18 GF |
| 1,349,906 | 4/1974 | United Kingdom | 273/73 F |
| 1,261,541 | 1972 | United Kingdom | 43/18 GF |

OTHER PUBLICATIONS
"Engineering Materials & Design", Materials Selector and Converter Mar., 1969, p. 7 of add between pp. 80 & 81.

Primary Examiner—Louis G. Mancene
Assistant Examiner—Peter K. Skiff
Attorney, Agent, or Firm—Dressler, Goldsmith, Clement, Gordon & Shore, Ltd.

[57] ABSTRACT

A fishing rod is provided which has a hollow tapered rod body of generally circular exterior cross-section which tapers from a large diameter handle end to a small diameter tip end, and a hollow interior extending along the rod axis which tapers in the same direction as the exterior of the rod. The rod body is constituted by laminations of a plurality of plies of fiber reinforced resin in which the fibers in each ply are parallel to one another, these plies including at least one inner ply having its fibers oriented at an angle of at least 30° to the axis of the rod, and a plurality of outer plies having their fibers generally parallel to the axis of the rod. The outer plies at the large diameter end of the rod have their fibers disposed at a progressively increasing angle to the axis of the rod as they approach the rod exterior, and this distributes the load to maximize the flexing strength of a rod of minimum weight.

7 Claims, 13 Drawing Figures

GRAPHITE FIBER FISHING ROD

The present invention relates to fishing rods constructed of graphite fiber-reinforced resins.

In the production of a conventional fiber-reinforced fishing rod, a tapered steel mandrel is wrapped with fibers at an angle to the axis of the mandrel, typically a single layer providing fibers at 45° angle to the mandrel axis. These angled fibers are then surrounded by a single multi-layer sheet having its fibers parallel to the axis of the mandrel. This multi-layer sheet is dimensioned to form a single wrap around the mandrel. After curing and removal of the mandrel, the 45° angle ply runs the full length of the interior of the tapered tubular rod which is formed providing transverse reinforcement which tends to maintain the round cross-section of the rod when it is flexed. The fibers which parallel the axis of the rod are on the exterior of the rod, and they provide axial flexural strength and stiffness.

When these fishing rods contain carbon (graphite) fibers of high modulus of elasticity, there is a tendency for forces to concentrate at the exterior surface of the rod near the handle of the rod when it is flexed during casting or when a fish is being reeled in. It is desired to provide maximum flexural strength in a rod of minimum weight, and this concentration of forces near the handle tends to cause the rod to break unless it is made larger and heavier to sustain these loads. The objective of this invention is to provide a fishing rod construction using carbon fiber-reinforced resins in which increased resistance to breakage on flexing is provided at any given rod size and weight. Naturally, this is of greatest importance in fishing rods which are hand held, so such fishing rods are primarily contemplated.

In accordance with this invention a fishing rod is provided having a hollow tapered rod body of generally circular exterior cross-section which tapers from a large diameter handle end to a small diameter tip end. The rod has a hollow interior extending along the rod axis which tapers in the same direction as the exterior of the rod. The rod body is constituted by laminations of a plurality of plies of fiber reinforced resin in which the fibers in each ply are parallel to one another. The plies include at least one inner ply having its fibers oriented at an angle of at least 30°, and preferably 45°, to the axis of the rod. Overlying the inner ply is a plurality of outer plies having their fibers oriented generally parallel to the axis of the rod. The outer plies at the large diameter end of the rod have their fibers disposed at a progressively increasing angle to the axis of the rod as they approach the rod exterior due to the way in which the plies are rolled onto the tapered rod. This skewed or angled alignment of the outer ply fibers near the exterior of the large diameter end of the rod produces less axial stiffness in the outer part of the fiber ply than is present in the inner part thereof which is adjacent to the inner ply and this yields a more uniform loading across the body of the rod so as to better resist breakage when the rod is flexed during the casting motion, or when a fish is being reeled in.

The rod may be made in one piece, or in sections which fit together with a ferrule.

The invention includes the method for producing the fishing rod.

The invention will be more fully understood from the accompanying drawings in which.

Figure 1:
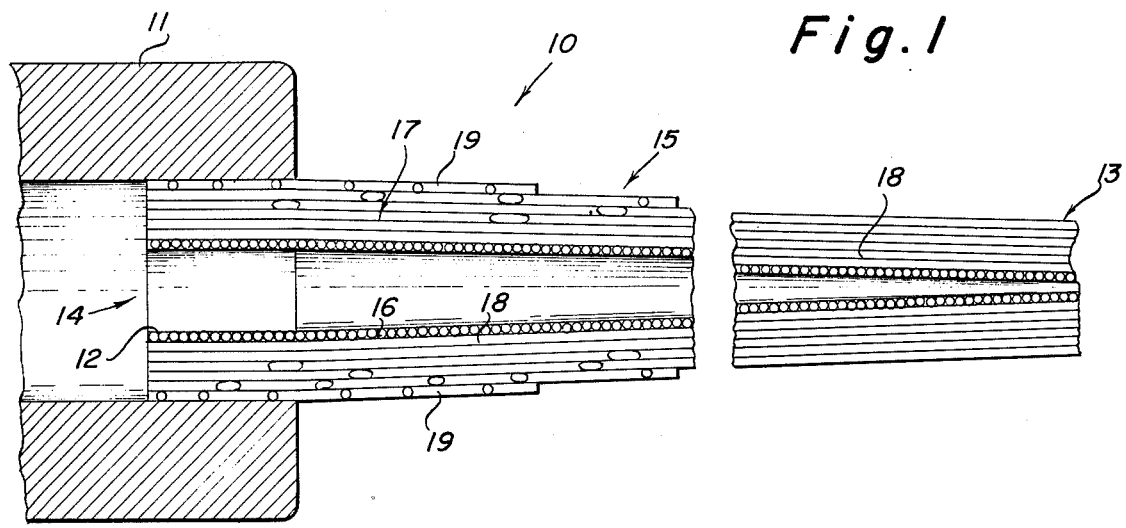
FIG. 1 is a cross-section showing a fishing rod constructed in accordance with this invention, portions being broken away to show the fiber alignment.

Referring more particularly to the drawing, FIG. 1 diagrammatically shows in cross-section the overall fishing rod which is constituted by a tapered hollow rod 10 and a handle 11 which is secured to the large end of the rod in any convenient fashion.

The fishing rod also includes the typical guides which are used on such rods, but they are not shown here for the convenience of portraying the structure of the rod.

Referring more particularly to the rod 10, it is hollow as indicated at 12 and the diameter of the tubular opening increases progressively from the small diameter end 13 to the large diameter end 14. It will be evident that the hollow portion 12 reflects the shape of the mandrel used in forming the rod, the mandrel having been removed.

The rod body is constituted by a fiber laminate 15 which includes an inner ply 16 in which the fibers are at a sizable angle, at least 30° with respect to the axis of the rod. It is customary to use a single ply of angled fibers at a 45° angle to the rod axis, but several plies can be used in a heavier rod, and then it would be desirable to balance the fiber angles by having one wrap at a 45° angle in one direction, and another wrap at a 45° angle in the opposite direction.

It is desirable to maintain the angle of the inner wrap 16 by spirally winding a tapered ply with the narrow end of the tapered ply positioned at the narrow end 13 of the fishing rod, but this is not essential.

The outer wraps 17 are the result of a rolling operation to be described hereinafter, but the structural result of this rolling operation can be seen in FIG. 1. As can be seen, the fiber direction in the outer wraps 17 is generally parallel to the rod axis, but this angle changes as the wrap moves outwardly from the center of the rod beyond the inner ply 16. Thus, the first outer wrapping 18 has its fibers parallel to the rod axis, but at the handle end 14 of the rod 10, the fibers are oriented at a progressively greater angle to the axis of the rod in each successive wrap so that the greatest angle is encountered at the outermost wrap 19 and the handle end 14. The increasing fiber angle is shown in the drawing by the progressively larger number of roving which are severed in each succeeding wrap.

Figure 2:
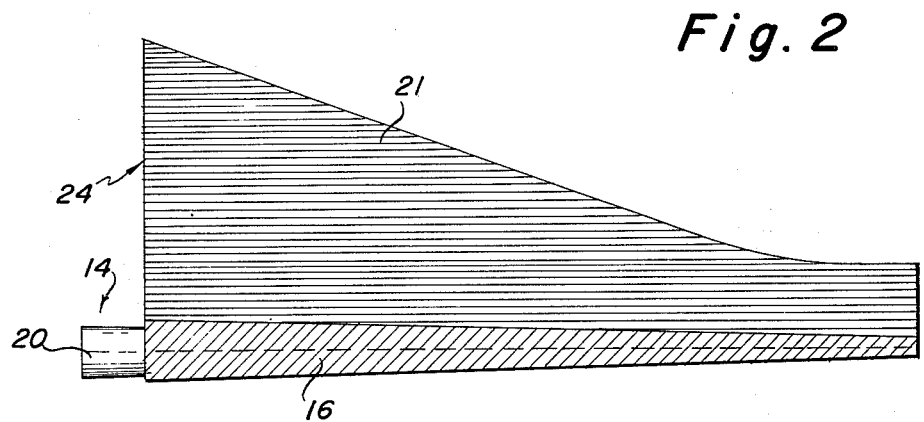
FIGS. 2-4 show the method used in producing a fishing rod in accordance with this invention.
Figure 3:
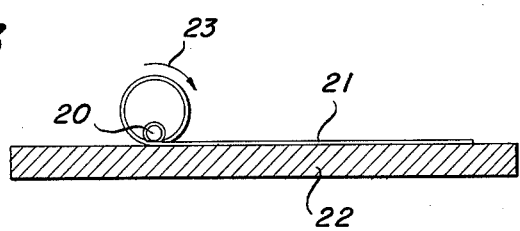
Figure 4:
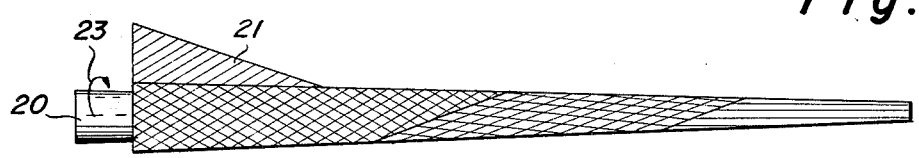

The rod of FIG. 1 is formed in the manner shown sequentially in FIGS. 2-4.

FIGS. 2 and 3 together show the start of the application of the outer wraps. As can be seen in FIG. 2, a tapered mandrel 20 has been spirally wound to provide an inner ply 16 with its fibers at a 45° angle to the axis of the rod. The mandrel 20 with the inner ply 16 thereon, is placed above the longitudinal edge of a generally right triangular-shaped fiber ply in which all the fibers are parallel to the said longitudinal edge. In considering the generally right triangular ply to be triangular, the shortest side is regarded as a point, the side which cuts diagonally through the fibers is the hypotenuse, while the edge that is parallel to the fibers is the long side of the triangle, noted hereinbefore as the longitudinal edge. This triangular ply is identified at 21, and the disposition of the mandrel 20 with respect to the longitudinal edge of the triangular ply 21 is shown in FIG. 3, where the mandrel atop the ply rest upon a work table 22. The rolling motion which is about to be used is shown by arrow 23. It will be manifest that the large diameter end of mandrel 14 will move across the wide end 24 of the triangular ply 21 more rapidly than any of the smaller diameter portions of the mandrel 20. As a result, the angle of the fiber of the ply 21 with respect to the axis of the rod will increase progressively with each revolution of the mandrel 20 during the rolling operation 23, and this is shown in FIG. 4.

The generally right triangular plies may be cut from a rectangular blank so as to obtain two generally triangular plies from each blank and thus economize on materials.

It will also be apparent that when the mandrel 20 is rolled across the triangular ply 21, the large diameter end of the mandrel will not track true along the side of the ply, but will instead follow an arcuate path. This provides an uneven end which can be remedied by trimming the ply either before or after the rolling operation, or it may be left untrimmed because the large diameter end of the rod will be encased in a handle.

It will be evident that fishing rods vary widely, depending upon their purpose, and the drawings include FIGS. 5-8 which show various outer plies which can be used for the production of various casting rods constructed in accordance with this invention utilizing a mandrel which is wound with the ply over a 60 inch tapered length, the mandrel being 0.257 inch in diameter at its large diameter end, and tapering uniformly to a diameter of 0.040 inch at its narrow diameter end.

Figure 5:
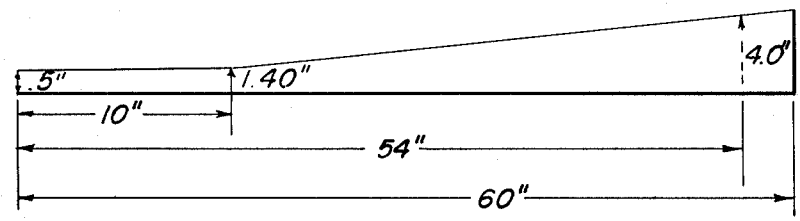
FIGS. 5-8 illustrate generally right triangular plies for various fishing rods as described herein.
Figure 6:
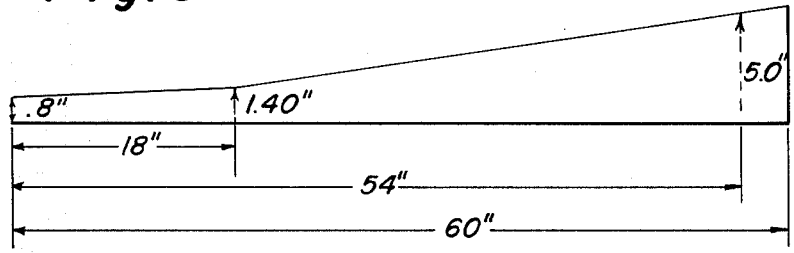
Figure 7:
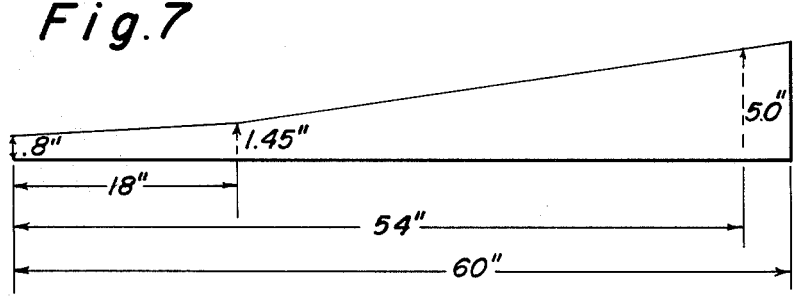
Figure 8:
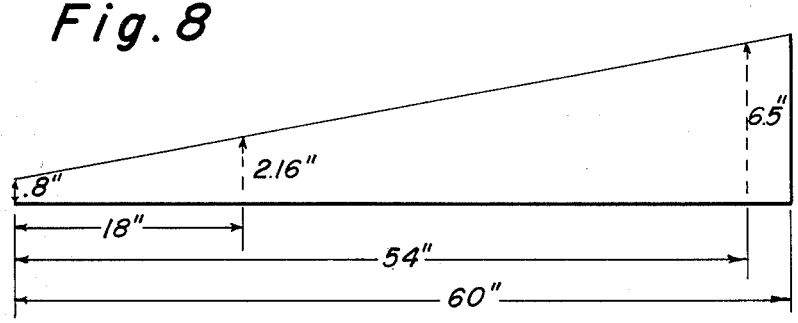

FIG. 5 shows the ply used to form an extra light casting rod, FIG. 6 a light casting rod, FIG. 7 a medium casting rod, and FIG. 8 a heavy (stiff) casting rod. The last 6 inches of the heavy end of the rod blank which is formed is embedded in the handle of the fishing rod, which may be of any convenient construction.

While the invention is particularly directed to hand held fishing rods of the type which are used in casting, the same concentration of stresses which occur on casting also takes place when the fish pulls on the line, so the invention is also applicable to fly rods, as well as rods used for surf fishing. If the rod is very long, it can be made in two pieces.

Two piece rods are made using the same fabrication technique as described above. Essentially two individual rods are produced and joined by a ferrule. Patterns for the outer plies of such two piece rods are shown in FIGS. 9-13.

Figure 9:
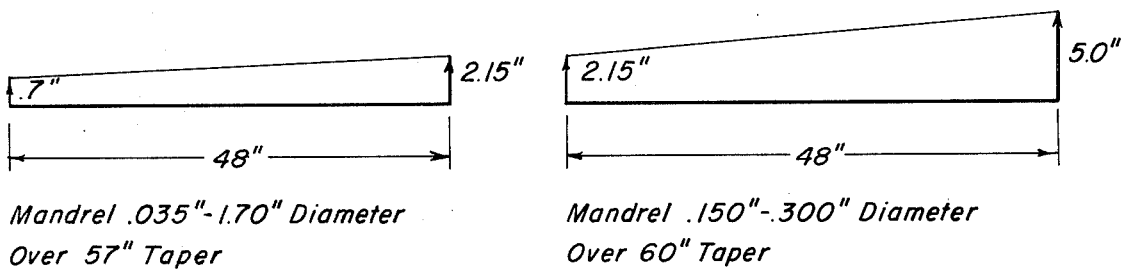
FIGS. 9-13 show the outer plies for various rods constructed of two sections.
Figure 10:
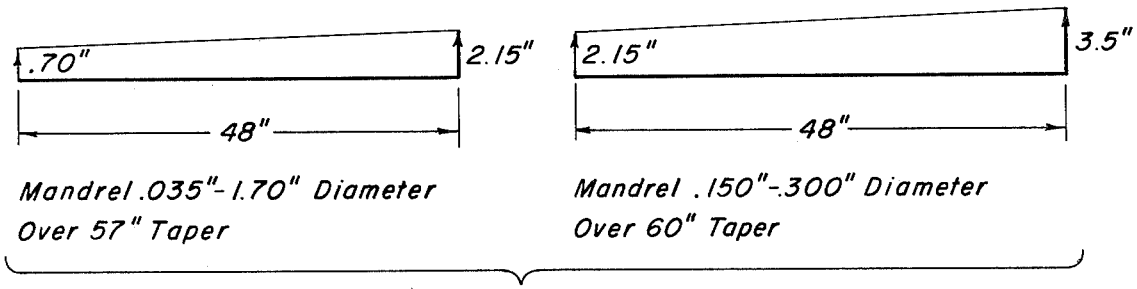
Figure 11:
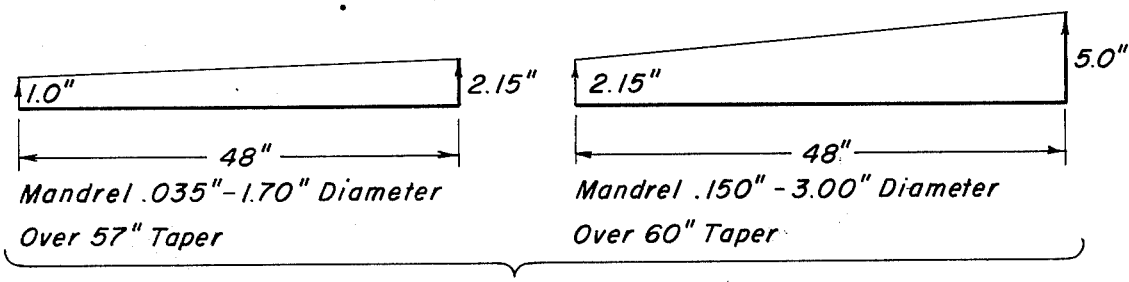
Figure 12:
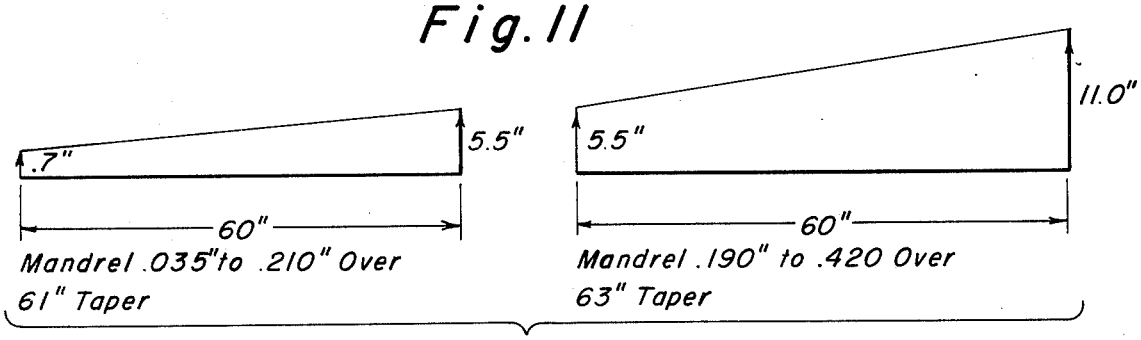
Figure 13:
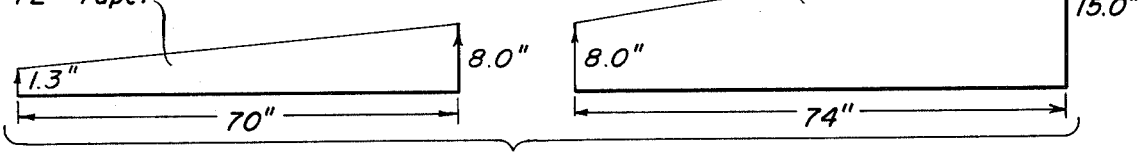

FIG. 9 shows a fast taper fly rod.
FIG. 10 shows a light fly rod.
FIG. 11 shows a stiff fly rod.
FIG. 12 shows a light surf rod, and FIG. 13 shows a heavy surf rod.

The two piece rods, such as fly rods, require less increase in stiffness toward the butt end than casting rods. The wrap pattern, therefore, has less taper and the resulting laminate is of more constant cross section throughout the rod length.

The ferrules which join the sections of the two piece rods may be of any type, but are preferably short sections of the same general design and fabrication as the rods, but have three layers of alternating 45° plies covered by three layers of 0°, or axial plies. The increased cross sectional strength and stiffness from the extra 45° plies serve to reinforce the enclosed rod end sections at the critical joint area. The ferrules are made on mandrels of the same general taper as the outside of the rods. Joining of the ferrule and the tip section of the rod is accomplished by inserting the tip section of the rod through the ferrule tube until it contacts near its lower, broader end. It is then bonded in place. The two piece rod is assembled by pushing the smaller end of the handle section into the bottom end of the ferrule. In the disassembled rod, the ferrule remains permanently attached to the broad end of the tip section.

The hollow tapered rod body of the fishing rod of this invention is constituted by a number of laminated plies which preferably contain from 55-63% by weight, preferably from 57-61% by weight, of fine diameter fiber possessing a high tensile strength and a high modulus of elasticity, especially carbon fibers. The precise diameter of the fiber is of secondary significance, but the important aspect is that the fibers are arranged in parallel order within the resin plies so as to give the resin body particular strength in the fiber oriented direction upon cure.

Appropriate resins may vary considerably, so long as it is hard and strong, but these are preferably thermosetting resins which cure on the application of heat to provide hard and tough resin matrices. The usual commercial resins for fiber reinforced laminates are epoxy resin systems, and these are preferably used herein. These epoxy resin systems can be cured with either acid or alkaline curing agents, and both types of curing systems are well known. The bisphenol-based diglycidyl ethers are preferably employed having an epoxy equivalent weight in the range of 150-600. Typical alkaline curing agents are illustrated by dicyandiamide. Typical acid curing agents are illustrated by phthalic acid or anhydride. The curing agents are used in stoichiometric proportions ± 25%. Other thermosetting resins are illustrated by commercially available organic solvent-soluble polyimides. Even thermoplastic resins, such as high melting fluorine-containing addition polymers illustrated by polytetrafluorethylene can be used. The point to be observed is that the high modulus fibers become chemically bonded into a resin matrix and the resin matrix itself, while relatively hard and tough, is totally incapable of handling the stresses which may be imposed upon the thin tapered rod which is to constitute the fishing rod of the present invention, without the specific wrapping features in the laminations of the rod.

The fibers which are utilized in this invention are primarily illustrated by fibers of carbon. Speaking generically, the fibers should have an average tensile strength above $300 \times 10^3$ p.s.i., and an average modulus of elasticity greater than $18 \times 10^6$ p.s.i. Commercially available carbon fibers customarily have these properties, but it is also possible to find such properties in boron fibers. Glass is not satisfactory since its modulus of elasticity is too low. Similarly, metals generally have much too low a modulus of elasticity also.

The fishing rod is made on a mandrel which has been cleaned and treated with a release agent to facilitate later removal of the cured laminate. The standard sequence of fabrication for all rod designs involves helically wrapping at least one long narrow ply around the mandrel at a 45° angle to the axis of the rod. This first ply is long and narrow with its fibers paralleling the length of the ply and is wound from the inner ply of the rod with its side margins in contact with one another without overlap. This provides a single inner ply or layer of rovings, all of which lie just above the plane of the mandrel. This is followed by the generally triangular ply with its parallel fibers being oriented to parallel the longitudinal side of the triangle. As the wrapping proceeds as described for FIGS. 2, 3, and 4, the fibers become increasingly angled away from the axis of the rod, and this distributes the load to maximize the flexing strength of a rod of minimum weight.

The plies in an illustration of this invention consist of epoxy resin-impregnated straight parallel carbon fiber tows (untwisted rovings) bound together with about 50% by weight of alkaline catalyzed epoxy resin in a tacky B stage*. The rovings used in this example are available in commerce under the trade designation HTS from Hercules, Inc., the individual fibers having a tensile strength of $350 \times 10^3$ p.s.i. and a modulus of elasticity in the range of $36$–$42 \times 10^6$ p.s.i.

* 1 part diglycidyl ether of bisphenol A (epoxy value 0.5) mixed with 5 parts of another diglycidyl ether of bisphenol A (epoxy value 0.2) and 4 parts of dicyandiamide applied to the rovings from solution in methylene chloride.

After these tacky plies, in the B-stage, have been wrapped around the mandrel as previously described, the wrapped mandrel is covered with a wrap of heat shrinkable tape, such as ⅛ inch wide polyvinyl acetate film, and cure is accomplished in an oven in which the long, flexible steel mandrel supporting the graphite material is placed in a stretcher designed to hold it straight during the cure cycle. A cure cycle of 2½ hours at 350° F is appropriate for the epoxy system noted hereinbefore. Using a commercially available epoxy material, Narmco Rigidite 5209, appropriate curing cycles are 60 minutes at 180° F., 30 minutes at 220° F., and 60 minutes at 260° F.

The mandrel with the cured graphite laminate is removed from the stretcher, and the mandrel is withdrawn from within the rod. The heat shrinkable film is unwrapped from the surface of the rod, leaving the cured graphite composite fishing rod blank ready for finishing which involves a very light sanding to prepare the surface which may be painted. The rod ends may be trimmed to provide an even edge or as at the handle end, it may be left uneven and merely inserted into a handle. The cure provides an integral laminate, sometimes referred to as a composite.

The invention is defined in the claims which follow.

I claim:

1. A fishing rod having a hollow tapered rod body of generally circular exterior cross-section which tapers from a large diameter handle end to a small diameter tip end, the rod having a hollow interior extending along the rod axis which tapers in the same direction as the exterior of the rod, said rod body being constituted by laminations of a plurality of plies of fiber reinforced resin in which the fibers in each ply have an average tensile strength above $300 \times 10^3$ p.s.i., and an average modulus of elasticity greater than $18 \times 10^6$ p.s.i. and are parallel to one another, said plies including at least one inner ply having its fibers oriented at an angle of at least 30° to the axis of the rod, and a plurality of outer plies having their fibers generally parallel to the axis of the rod, said outer plies at the large diameter end of the rod having their fibers disposed at a progressively increasing angle to the axis of the rod as they approach the rod exterior.

2. A fishing rod as recited in claim 1 in which said fibers are carbon fibers.

3. A fishing rod as recited in claim 1 in which the fibers of the inner plies are oriented at a 45° angle to the axis of the rod.

4. A fishing rod as recited in claim 1 in which said resin is an epoxy resin.

5. A fishing rod as recited in claim 1 in which said rod is constituted by two sections, each of which are constituted by a hollow tapered rod body as described in claim 1 connected together by a ferrule.

6. A fishing rod as recited in claim 1 in which said rod body is constituted by 55–63% by weight of carbon fibers, balance resin.

7. A method for producing a fiber reinforced resin fishing rod blank, the fiber reinforcement having an average tensile strength above $300 \times 10^3$ p.s.i. and an average modulus of elasticity greater than $18 \times 10^6$ p.s.i., comprising the steps of helically wrapping a long narrow inner ply of fiber reinforced resin having its fibers parallel to the length of the ply around a tapered mandrel with the side edges of the ply contacting one another without overlap, thus providing an inner ply having fibers oriented at an angle of at least 30° to the axis of the mandrel, providing a generally right triangular outer ply having a longitudinal side and a short side and having parallel fibers which are aligned with the longitudinal edge of the ply, placing said mandrel with said inner ply thereon atop the said longitudinal edge of said generally right triangular outer ply with the large diameter end of the mandrel being positioned at the said short side of the triangle, and then rolling said mandrel across said outer ply so that the large diameter end of the mandrel will move more rapidly across the outer ply than the remainder of the mandrel so that the fibers at the large diameter end of the mandrel will progressively increase their angle with respect to the axis of the mandrel as they approach the exterior of the rod which is formed, and then curing the wrapped mandrel to consolidate the plies into an integral laminate.

* * * * *